United States Patent [19]

Rumble

[11] Patent Number: 4,543,624

[45] Date of Patent: Sep. 24, 1985

[54] UNITARY ELECTRICAL PLUG WITH MULTIPLE INLETS AND VOLTAGE CONVERTER

[75] Inventor: Clive S. Rumble, London, England

[73] Assignee: Corabelment A.G., Vaduz, Liechtenstein

[21] Appl. No.: 408,770

[22] Filed: Aug. 17, 1982

[30] Foreign Application Priority Data

Jan. 18, 1982 [GB] United Kingdom ................ 8201337

[51] Int. Cl.[4] ................................ H02M 1/00

[52] U.S. Cl. ................................ 363/146; 363/141

[58] Field of Search ............... 363/141, 142, 143, 146; 339/32 R, 32 M, 33

[56] References Cited

U.S. PATENT DOCUMENTS

| | | | |
|---|---|---|---|
| 3,833,821 | 9/1974 | Weaver | 363/143 X |
| 3,880,491 | 4/1975 | Ferro et al. | 339/112 R |
| 4,273,406 | 6/1981 | Okagami | 339/147 |

FOREIGN PATENT DOCUMENTS 0048078 3/1982 European Pat. Off. .

OTHER PUBLICATIONS

1980 Radio Shack Catalog, p. 73.

1982 Radio Shack Catalog, p. 87.

*Primary Examiner*—Peter S. Wong

*Attorney, Agent, or Firm*—Stevens, Davis, Miller & Mosher

[57] ABSTRACT

A unitary housing (10) characterized in that it has an outlet (13) arranged to receive an electrical plug via an electrical voltage converter, as defined, said converter being connected on or in said housing to an electrical plug with multiple inlet pins ($I_2$ $I_3$ $I_4$ $I_5$) that are able to be arranged readily to fit the various geometries (FIGS. $5_A$–$5_D$) of electrical voltage power outlet sockets to be found in the different major countries of the world.

4 Claims, 19 Drawing Figures

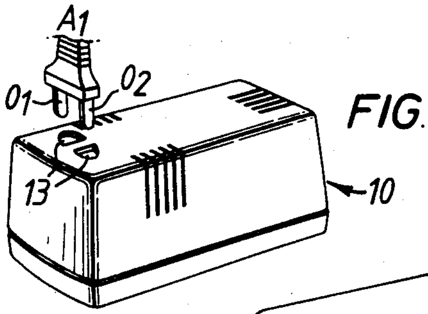
FIG. 5A
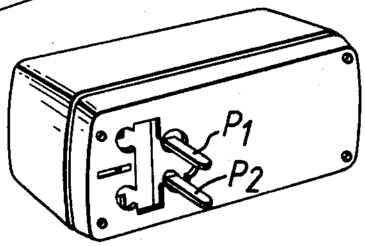
FIG. 5B
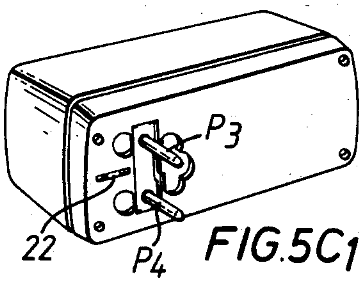
FIG. 5C1
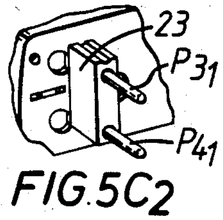
FIG. 5C2
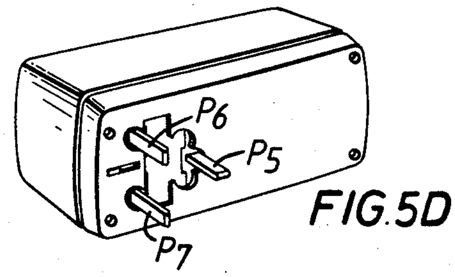
FIG. 5D FIG. $6_A$
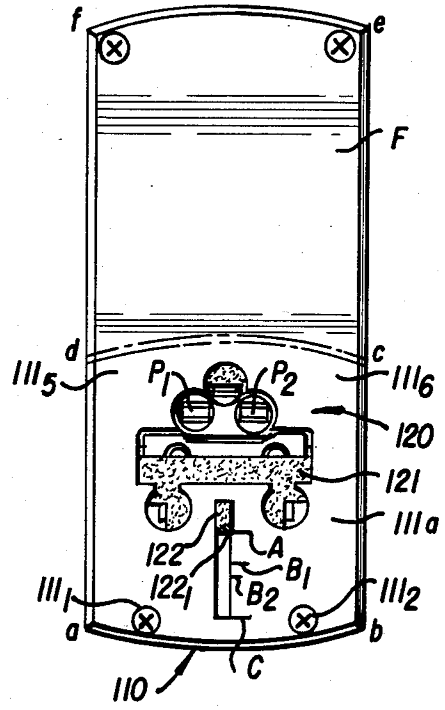
FIG. $6_B$
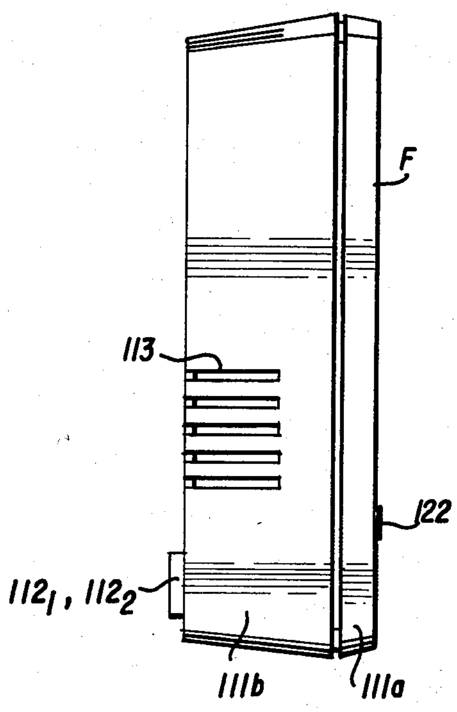
FIG. $6_C$
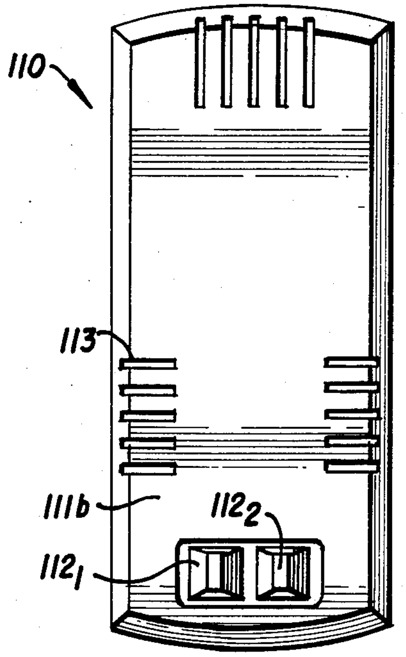
FIG. $7_1$
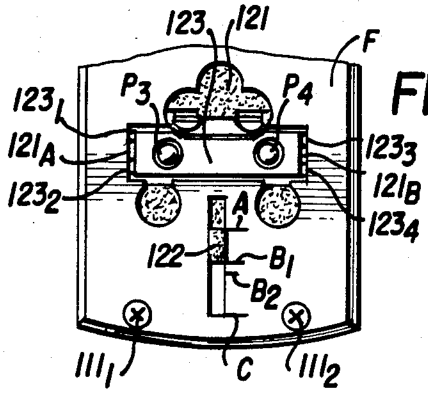
FIG. 8
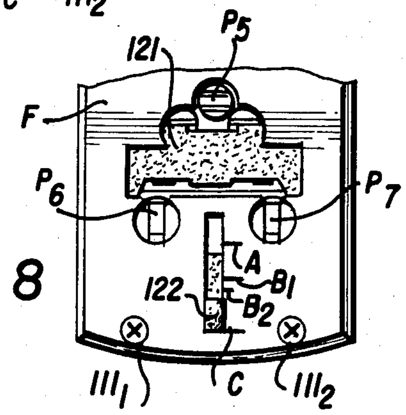

UNITARY ELECTRICAL PLUG WITH MULTIPLE INLETS AND VOLTAGE CONVERTER

It is well known to travellers that the electrical voltage supply in the major countries of the world, not only varies in the strength of the voltage offered to the travelling consumer but in the geometry of the socket at the voltage outlet.

It has been common for many years for experienced travellers to equip themselves with an electrical adapter having a multiplicity of pins that can be quickly changed to meet the various geometries of the socket outlets. But to meet the various changes in voltage a separate voltage converter has also been essential and this is often forgotten.

By the term voltage converter is herein meant any device for changing the electrical energy from one strength to another such as a step-up or step-down transformer or any electrical or electronic circuit that can product the same or a similar end result to that of the said transformer; or again the converter may be a converter per se in which a.c. is changed to d.c. or an inverter in which d.c. is changed to a.c.

The complexities associated with various voltage conversions, and the speed of air travel are such that they often combine to provide a source of real annoyance and frustration to the traveller. It is to overcome these irritations that there is provided according to the present invention a unitary housing characterised in that it has an outlet arranged to receive an electrical plug via an electrical voltage converter, as defined above, said converter being connected on or in said housing to an electrical plug with multiple inlet pins that are able to be arranged readily to fit the various geometries of electrical voltage power outlet sockets to be found in the different major countries of the world.

One embodiment of such a unitary device of the invention is given below by way of example only and is described with reference to the figures of the accompanying drawings in which.

FIGS. 5A, 5B, 5C1, 5C2, 5D taken seriatim are views in oblique perspective showing:

i. the plugging in of an electrical appliance to the unitary plug converter of FIGS. 1 to 4.

ii. inlet pins selected for inter-alia United Kingdom electrical outlet socket.

iii. inlet pins for inter-alia Europe and South America, inset pins not extended.

iv. as in iii above with inlet pins extended.

v. Simple inlet flat pins selected with double geometry for inter-alia U.S.A., Canada, Japan, Australia, New Zealand.

FIGS. 6–8 of the drawings show the plugs of FIGS. 1 to 5 in more detail. More specifically:

FIGS. 6A, 6B, 6C are presented in third angle orthographic projection. FIG. 6A shows an inlet voltage face of a multiple plug, FIG. 6B a side elevation and FIG. 6C an outlet voltage face.

FIG. $7_1$ shows the inlet face of FIG. 6A with an alternative inlet configuration different from that of FIG. 6 but in an intermediatry condition.

FIG. $7_{1A}$ shows to an enlarged scale, in oblique perspective, the configuration of FIG. $7_1$.

FIG. $7_{1B}$ also in oblique perspective shows the pin configuration in its final form for one of the electrical usages.

FIG. 8 is another alternative inlet configuration shown in a form similar to that of FIGS. 6 and 7.

Figure 1:
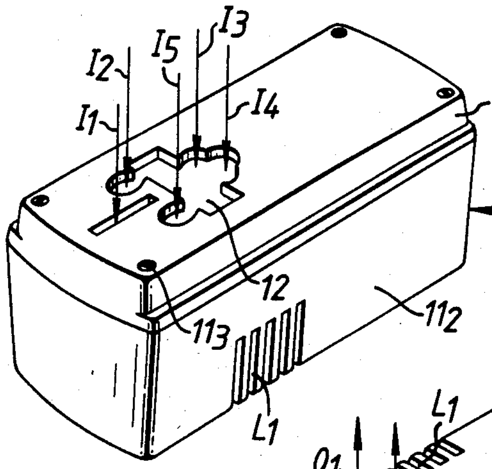
FIG. 1 is a view in oblique perspective of a unitary plug converter showing its base and electrical inlet.
Figure 2:
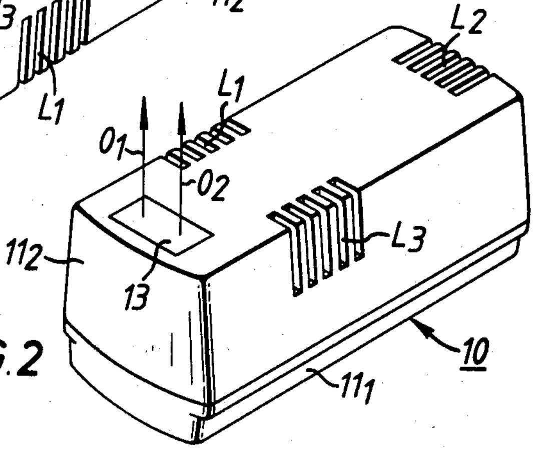
FIG. 2 is a similar view to FIG. 1 showing the top and electrical outlet.

Referring now to FIGS. 1 and 2 the unitary housing of the plug voltage converter is shown generally at 10, it is made in two parts $11_1$, $11_2$ screwed together as at $11_3$; the parts are preferably made from a flame resistant hard plastics material. The housing contains an adapter comprising an electrical plug with multiple inlets (not shown). The multiplicity of pins is represented by arrows $1_2$ to $1_5$ forming a plug inlet 12 for voltage from an electrical power supply. The pins are variable in their geometry as is known to meet the various configurations and sizes of electrical voltage power outlets of the major countries of the world.

The voltage converter (not shown) is electrically connected to the outlet 13 in the housing of an adapter and louvres such as L1, L2, L3 allow any heat generated therein to be readily dissipated.

The electrical outlet socket 13 is able to accept for example a two pin outlet as shown by arrows $0_1$, $0_2$.

Figure 3A:
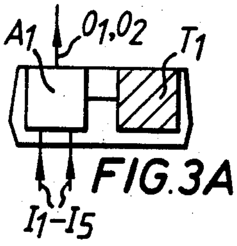
FIGS. 3A to 3D are schematics showing various constructions of the unitary plug converter.

In FIG. 3A the plug voltage converter has an adapter A1 with a multiplicity of electrical inlet pins $I_1$–$I_5$ and electrical outlet sockets $0_1$, $0_2$. The adapter $A_1$ is electrically connected to a step-up transformer $T_1$ (say 110 v input to 220 v output at 65 watts).

Figure 3B:
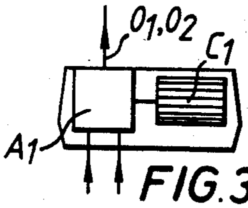
Figure 4:
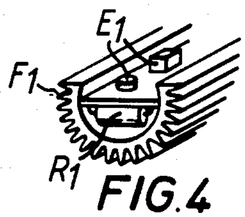
FIG. 4 is a view in oblique perspective of a device having a metal heat sink.

In FIG. 3B the adapter $A_1$ is electrically connected to a voltage converter $C_1$ as shown in FIG. 4 said converter having a heat sink with pins $F_1$ a resistor $R_1$ and electronic components $E_1$ (say for 220 v input to 110 v output) at 1500 watts or 65 watts).

Figure 3C:
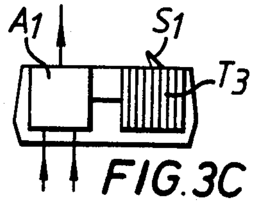

In FIG. 3C the adapter A1 is electrically connected to a step-up, step-down transformer T2 selected by a switch S1.

Figure 3D:
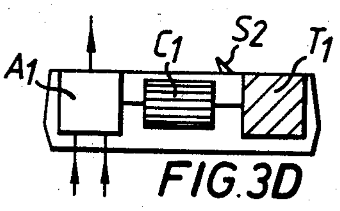
Figure 71A:
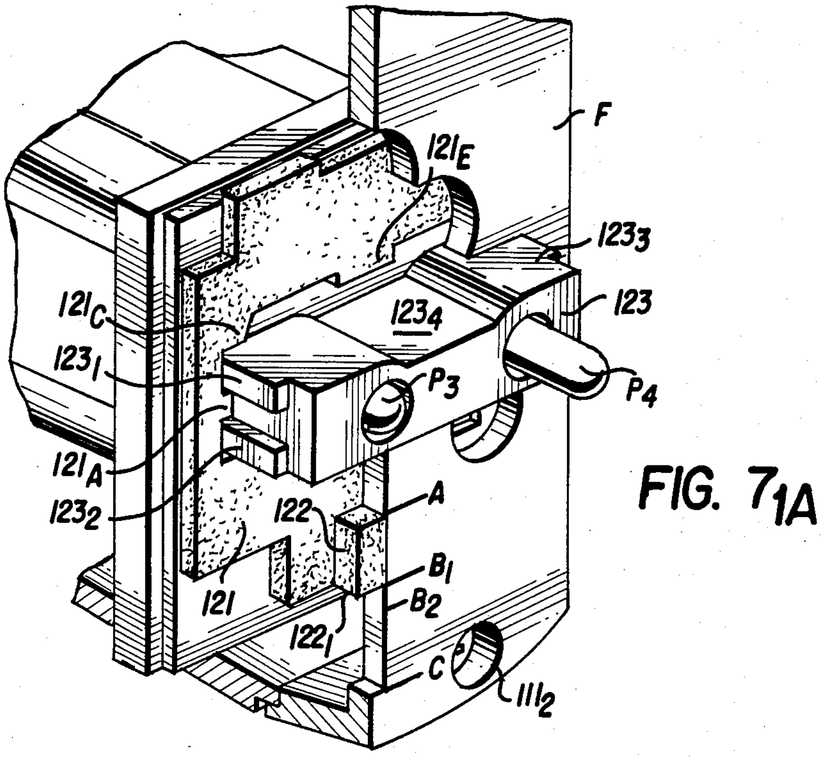
Figure 71B:
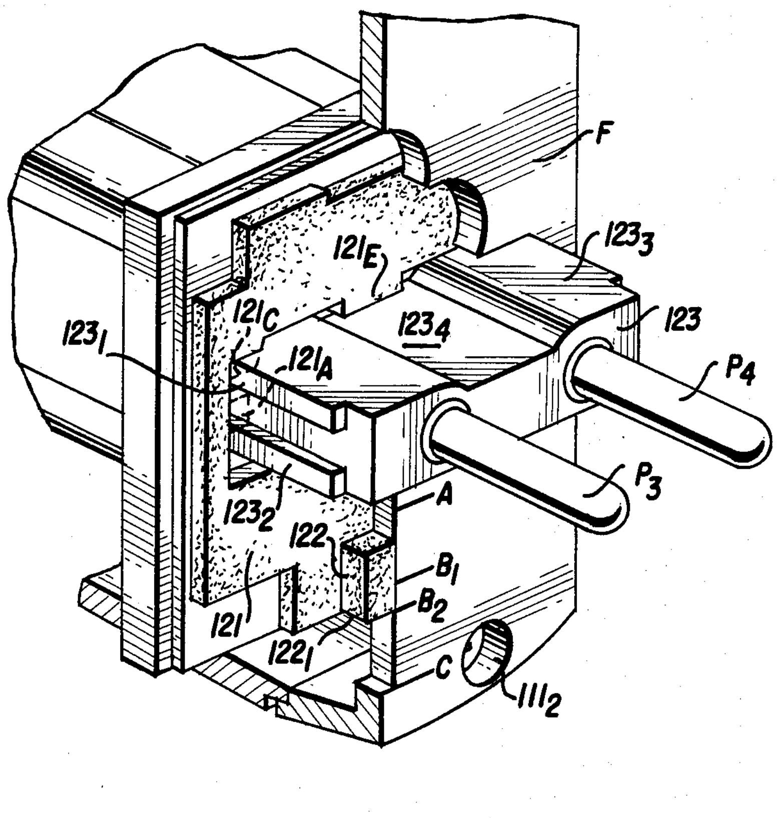

In FIG. 3D the adapter A1 is electrically connected to a step-up transformer T1 (as in FIG. 3A) and a voltage converter C1 (as in FIG. 3B) selection of either T1 or C1 being controlled by switch S2.

In FIG. 5A the above described unitary plug/converter is shown with a multiple goemetry outlet as described and claimed in my co-pending application Ser. No. 407,571, filed Aug. 12, 1982. Any suitable appliance A1 is plugged into the plug/converter shown generally at 10 at orifices 13 using outlet pins $0_1$, $0_2$ (FIG. 2).

In FIG. 5B a flat pin pair $P_1$, $P_2$ is selected; said pins provide two geometries one as shown the other by orientation of the pins on their axes for different voltage outlets as met for example in the U.S.A., Canada, Japan, Australia and New Zealand.

In FIG. $5C_1$ a right cylindrical pin pair $P_3$ $P_4$ is selected non-extended and in FIG. $5C_2$ pin pair $P3_1$ $P4_1$ extended via pin slide 23 under the control of a shutter plate not shown actuated by slider 22.

In FIG. 5D a three flat pin inlet is selected for say a United Kingdom standard voltage outlet, the pins being shown at $P_5$ $P_6$ $P_7$.

Turning now to FIGS. 6 to 8 in view of the more detailed description different reference numerals are used.

Referring now specifically to the figures. In FIGS. 6A, 6B, 6C a unitary plug shown generally at 110 has either an inlet face F with a two part case 111*a*, 111*b* held together by screws $111_1$, $111_4$. The case has outlet sockets $112_1$, $112_2$ and vent louvres 113.

Consider now the multiple pin plug shown generally at 120 (FIG. 6A). A movable shutter plate 121 has an integral slider 122 accessible to the hand of the operator, the edge $122_1$ of the slider may be brought into alignment with index marks on the inlet face such as marks A, B1, B2 and C to give four separate pin geometries.

In FIG. 6A the edge $122_1$ is against index mark A and the flat pin pair P1, P2 are withdrawn and each turned through an angle A. Spring bias is provided to locate the pins in the turned position which is the correct position for use in accepting the electrical voltage outlets of U.S.A. and Australia for example. This is a first pin geometry.

Consider now the position shown in FIG. $7_1$. The edge $122_1$ of slider 122 is against index mark B1 and the pin pair P3, P4 may be each withdrawn and rotated on their individual pin axes to engage a screw threading and thus be locked and the pins used in ths position. This is a second pin geometry.

Consider now the position shown in FIGS. $7_1$, $7_{1A}$. The edge $122_1$ of slider 122 is again at index mark $B_1$ (FIGS. $7_1$, $7_{1A}$) and slider plate 121 allows in-slide 123 of general rectangular prismatic form to be withdrawn out of inlet face F and to be frictionally located. The pin-slide 123 has integral side rails $123_1$, $123_2$, $123_3$, $123_4$ that coact with opposed plate protuberances 121A, 121B (FIG. $7_1$). With the pin-slide 123 extended (FIG. $7_{1B}$) the right cylindrical pin-pair P3, P4 is locked by rotation of each pin individually as described above and the shutter plate 121 moved so that edge $122_1$ is in alignment with index mark $B_2$ (FIG. $7_{1B}$). This brings opposed plate protuberances 121A, 121B, 121C, 121D respectively behind the pin slide rails $123_2$, $123_4$, $123_1$, $123_3$. This is shown for cooperating parts 21A/$23_2$; 21C/$23_1$ in FIG. $2_{1B}$ (co-operating parts 21B/$23_4$; 21D/$23_3$ are not visible). The shutter plate 121 is provided with a protuberance 121E (well seen in FIG. $7_{1B}$) that with the plate on index B2 brings the edge of protuberance 121E agains face $123_4$ of pin-slide 123 and gives to it an enhanced stability in electrical usage. Clearly at index mark position B2, pin-pair P3, P4 in pin slide 123 cannot be retracted to re-enter the plug until protuberances 121A, 121B, 121C, 121D are again raised for edge $122_1$ to come on to index mark B1 when the pin-slide 123 is retractable.

The pin-pair P3, P4 with pin slide 123 extended as shown in FIG. $7_{1B}$ is for use with the recessed electrical voltage outlet sockets to be found in Germany, Belgium and other parts of Europe, for example such as the Schuko socket. In some such sockets an earth pin from the socket can enter the plug inlet over rail $123_4$. This is a third pin geometry.

In FIG. 8 the shutter plate 121 is with edge $122_1$ at index C and the three heavy rectangular section pins P5, P6, P7 can come out beyond the inlet face F and are each rotated through a right angle to lock the pin. These pins are for use with the voltage outlets to be found inter alia in the United Kingdom, pin P3 being an earth pin oriented one right angle out of alignment with live and neutral pins P6, P7. This is a fourth pin geometry.

I claim:

1. An electrical connecting device comprising a unitary housing, an adapter in the housing with a multiplicity of electrical contact pins retractable into the housing and extendable in a plurality of arrays each suitable for an electrical power supply, an electrical outlet for an electrical plug, and intermediate the adapter and the electrical outlet an electrical voltage converter.

2. An electrical connecting device as claimed in claim 1, wherein the adapter includes a heat sink.

3. An electrical connecting device comprising a unitary housing, an adapter in the housing in the form of a multiple pin electrical plug for selectively connecting to different pin configurations, comprising a plurality of selectively extendable pins; the adapter having a shutter plate movable by a hand operated slider between a plurality of discrete positions for selecting one of said different configurations and permitting extension of predetermined ones of said pins, at least one pair of said pins being provided on a prismatic sliding member, said sliding member having guide rails, said shutter plates having protuberances co-operating with said guide rails to permit said sliding member to be exended from or retracted into said plug when said shutter member is in one of said discrete positions and to permit movement of said shutter plate into another discrete position, preventing retracting of said sliding member, when the latter is extended, an electric outlet for an electrical plug and, intermediate the adapter and that electrical outlet, an electrical voltage converter.

4. A device as in claim 3, wherein said shutter plate has means presenting among four different pin configurations, a first in which said plug provides an extended flat pin pair, a second in which said plug provides an extendable and retractable cylindrical pin pair, a third in which said plug provides an extended and not retractable cylindrical pin pair, and a fourth in which said plug provides three extended flat pins.

* * * * *